United States Patent

[11] 3,603,061

| [72] | Inventor | Oren B. Harmes<br>Algona, Iowa |
|------|----------|-------------------------------|
| [21] | Appl. No. | 8,281 |
| [45] | Patented | Sept. 7, 1971 |
| [73] | Assignee | Metronics Incorporated<br>Algona, Iowa |

[54] BOX-SEALING MACHINE
18 Claims, 4 Drawing Figs.

[52] U.S. Cl. .................................... 53/374,
53/383, 118/7, 118/410
[51] Int. Cl. ...................................... B65b 7/20
[50] Field of Search ........................................ 53/374,
383; 118/7

[56] References Cited
UNITED STATES PATENTS

| 2,948,098 | 8/1960 | Hanson et al. ................ | 53/383 X |
| 3,426,502 | 2/1969 | Greenberg .................... | 53/374 X |

*Primary Examiner*—Travis S. McGehee
*Attorney*—Schroeder, Siegfried & Ryan

ABSTRACT: A machine in which an object is conveyed thereon over a predetermined path and varying work functions are performed on the object incident to the movement of a conveyor on the machine and in accord with the operation of a cam follower on a cam surface in which the cam surface is adjustable to vary the frequency in timing of the work function.

INVENTOR
Oren B. Harmes
BY
Schroeder Siegfried & Ryan
ATTORNEYS

PATENTED SEP 7 1971

INVENTOR
Oren B. Harmes
BY
Schroeder Siegfried & Ryan
ATTORNEYS

BOX-SEALING MACHINE

My invention relates to a machine in which an object is conveyed thereon over a predetermined path and a work function is performed on the object as an incident to movement of the conveyor and in accord with the operation of a cam follower on a cam surface in which the cam surface is adjustable to vary the frequency or timing of the work function.

Machines in which an article is positioned thereon and is moved on the machine while a plurality of work functions are performed on the article are broadly old and take a variety of forms. In such machines, a limitation is normally provided in the size or shape of the article involved and the particular work function is controlled only with respect to the starting and stopping of the same. More sophisticated structures are provided, however, in which the work functions are programmed and complicated control apparatus and complicated machinery are required for performing the function.

A simplified machine in this category is one in which erected cartons are filled and the flaps of the same closed and sealed. Certain of the work functions in such a machine would be flap closing while another would be the application of glue to the carton flaps to maintain the flaps in a sealed relationship after folding. A simplified machine of this type is shown in the present application. Prior machines of this general category have utilized stopstart-type controls for the glue applicator, which controls have taken the form of wire actuated switches, photo cells, air actuated switches and the like, all of which merely start and stop the application of glue but perform no control over the glue applicator once operation is initiated. Generally, this type of apparatus is restricted to a particular size of carton and where it is desired to provide a machine which would handle a variety of sizes of cartons, the simplified on-off control is normally inadequate for such operation. Further, these prior machines do not lend themselves to varying glue patterns and in certain types of cartons it is desired to apply glue over certain portions of a flap area and omitting others for ease in opening of the carton and to insure that glue or adhesive does not enter the carton. Prior machines of this type and controls for the same will not perform the function of handling a variety of sizes of cartons and a variety of glue patterns which are readily adjustable.

In the present invention, an improved machine is provided which is particularly applicable for a top filler, closure and sealer machine in which a variety of carton sizes may be handled and sealed and in which change over for varying carton sizes is accomplished with ease. In addition, the improved machine employs a simplified control incorporating an adjustable cam surface which permits control of a glue applicator in a variety of patterns such that a variety of sizes of cartons and a variety of glue patterns may be obtained therefrom. In the improved machine, the guides defining the work path are adjustably positioned on the frame to accommodate varying sized cartons and individual controls associated therewith operate controllers to actuate flap folding mechanisms for the varying sized cartons. The cartons are moved on the machine through a reciprocating type conveyor which has associated therewith a controller for the glue applicator, the latter including an adjustable cam surface upon which adjustment may be made to vary controller operation in accord with any desired glue pattern and carton size. While such control is shown herein in connection with the application of glue, it may be employed in varying types of machines in which a work function is performed on an article in accord with adjustable patterns.

Therefore it is the principal object of this invention to provide an improved machine having a control mechanism controlling operation of a work function in accord with an adjustable cam surface.

Another object of this invention is to provide an improved top closure sealer machine for boxes.

Another object of this invention is to provide a machine of this type in which the machine is adjustable for varying sized cartons.

A further object of this invention is to provide an improved top closure sealer machine for cartons having an improved glue applicator to provide a variety of glue patterns for the cartons flaps.

Another object of this invention is to provide in a glue applicator control an adjustable cam surface with a plurality of circular elements having flat surfaces thereon which are adjustable relative to one another to provide an adjustable camming surface for varying the operation of the glue applicator.

A further object of this invention is to provide a simplified machine of this type which is relatively low in cost and easy to adjust and use.

These and other objects of this invention will become apparent from reading of the attached description together with the drawings wherein.

Figure 1:
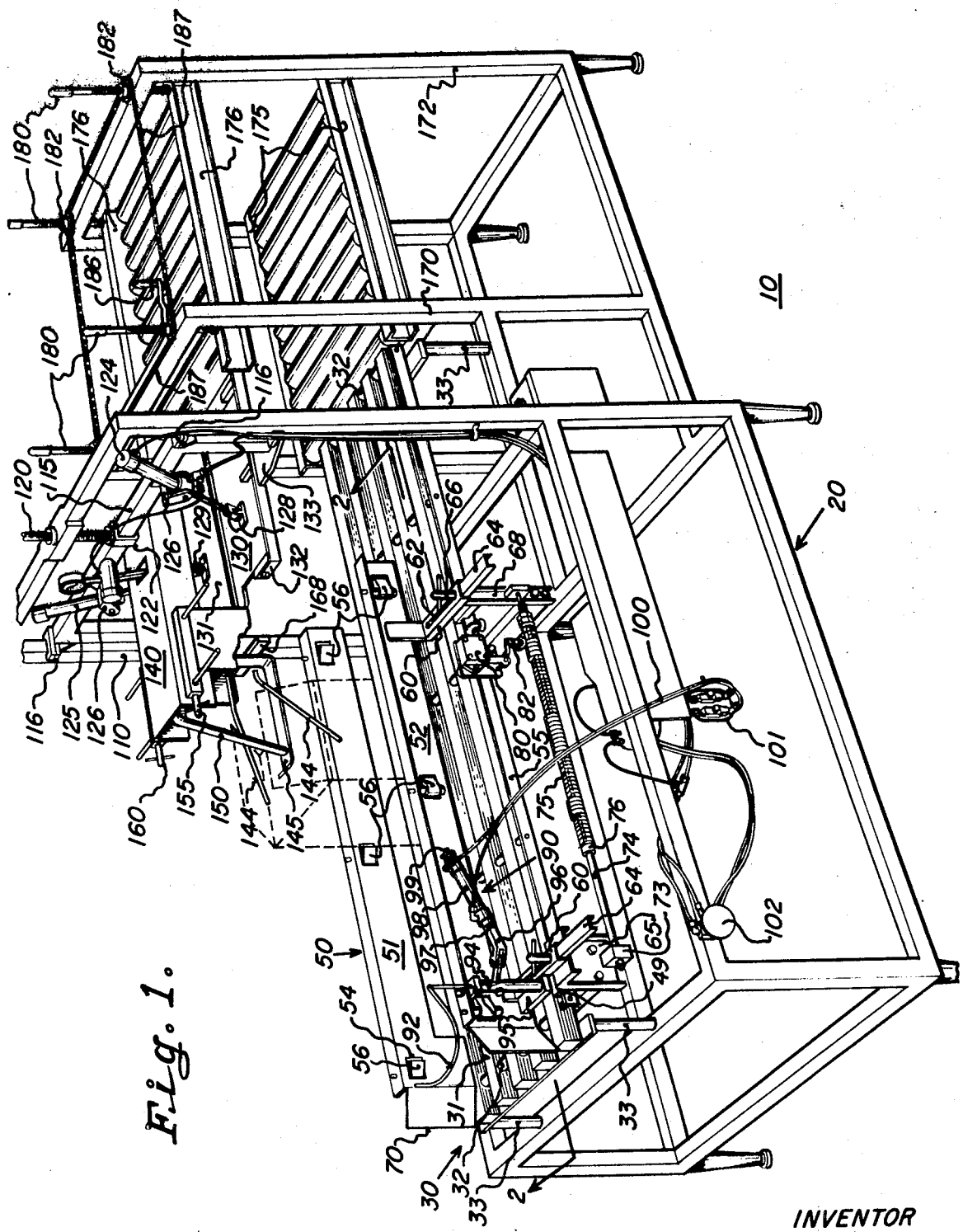
FIG. 1 is a perspective view of a box-sealing machine from the front disclosing my invention.
Figure 2:
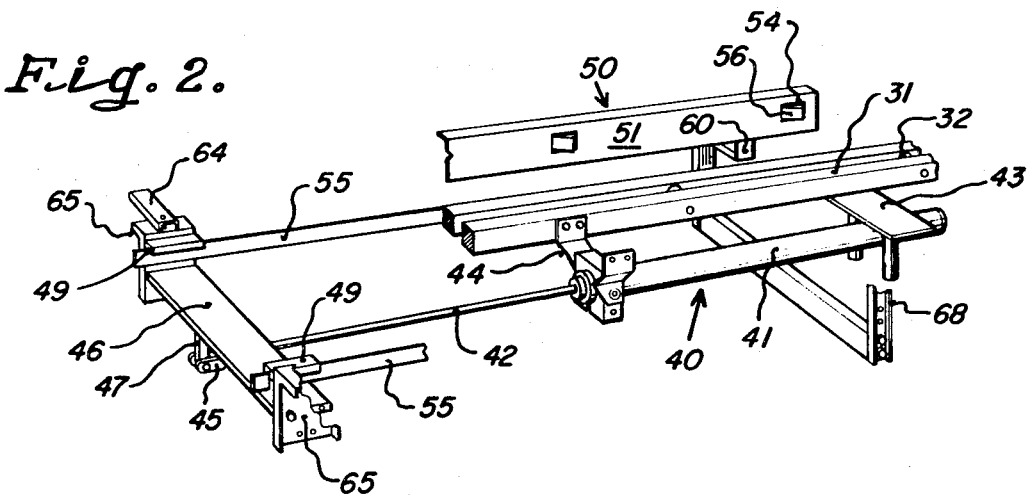
FIG. 2 is a perspective view of the actuator and conveyor portion of the machine.

In the drawings, my invention is shown in the form of a simplified top closure and sealer machine adapted to receive erected and empty cartons in which the cartons are manually loaded with the contents thereof and moved along the bed of the machine to points wherein certain of the flaps have glue applied thereto and the flaps are folded and closed on one another to form a sealed or closed carton. Thus in FIG. 1, the machine is shown generally at 10 as incorporating a barlike frame structure 20 having at one end or side thereof an elevated bed portion 30 comprised of a plurality of elongated bars 31, generally square in cross section which extend along a portion of the machine from one end thereof and are held together in spaced relationship by transversely extending spacer members 32. The bed portion of the machine extends from one end of the frame along the extent of the same over the larger part of the length of the frame and is elevated by posts 33 on the frame permitting the location of an actuator 40 (see FIG. 2) beneath the same which operates a conveying portion of the machine or the conveyor, indicated generally at 50.

Actuator 40 includes a cylinder 41 and extensible shaft 42 with suitable mounting plates 43, 44 connected to the extremities of the cylinder by means of which the cylinder is secured to the undersurface of the rods 31. The shaft 42 carries at its extremity a coupling member 45 which is secured to a platelike coupler 46 through a tongue 47 formed integral with the plate, the plate riding on the undersurface of the rods and having upstanding flange portions 49 extending upwardly along the edges of the rods and above the same to mount on slide bars, indicated at 55 attached to the edges of the bed portion of the machine which bars, as will be later noted, carry other portions of the conveyor. The conveyor 50 includes a pair of guide plates or rails 51, 52 which are positioned on the upper surface of the bed defined by the rods 31 which plates or rails are generally L-shaped in cross section and have slots 54 along the extent of the same in which are mounted pivoted flange members 56. These flange members are spring biased to project through the slots and in the guide plates or rails 51, 52 and as will be later noted, engage the back surface or sides of a carton for the purpose of advancing the same along the bed. The guide plates 51, 52 are connected to the conveyor actuator by means of a plurality of transversely extending flange members or flanges 60 which are attached to the plates at varying points along the extent of the same through suitable means, such as welding. These flange members include a slotted surface 62 and are generally U-shaped or channel shaped in form to fit over a barlike guide 64 carried by an L-shaped flange member 65, the flange member in turn being connected to the upstanding flange portions 49. Suitable threaded guide posts 66 extend into a tapped aperture in the flange 65 and through the slot 62 to adjustably position the guide members 51, 52 on the flange members 65. The flanges 60 attached to the plates 51, 52 and remote from the end which is directly coupled to the actuator shaft 42 are similar in shape with the flanges 60 and each have the slot 62 therein. They are similarly U-shaped in cross section to fit over bar members 64 attached to channel-shaped flange members 68 which slide on to the slide bars 55. Thus the guide plates 51, 52 may be adjustably positioned on the bed and the distance between the same altered through operation of the bolts or posts 66 to loosen the connection of the flanges 60 with the connecting structure allowing the guide members to be spaced apart any desired distance within the limits of the slots 62 in the flanges to accommodate varying width cartons. The guide plates 51, 52 in addition to forming part of the conveyor define a guide path for the carton on the bed 30 as the cartons are moved through operation of the actuator 40. The extremities of the guide plates nearest the shaft end extremity of actuator 40 are flared or bent outwardly, as at 70, to permit entrance of a carton at the end of the bed and the individual pivoted flange member 56 therein which pivot through the slots 54 are spring-biased so as to project into the area between the guide plates for the purpose of engaging a carton as the entire conveyor assembly moves toward the center of the frame. On the return stroke the pivoted flange member 56 will pivot against the force of the springs associated therewith (not shown) to allow the flanges to pivot inwardly and slide by a carton in the guide path.

Figure 3:
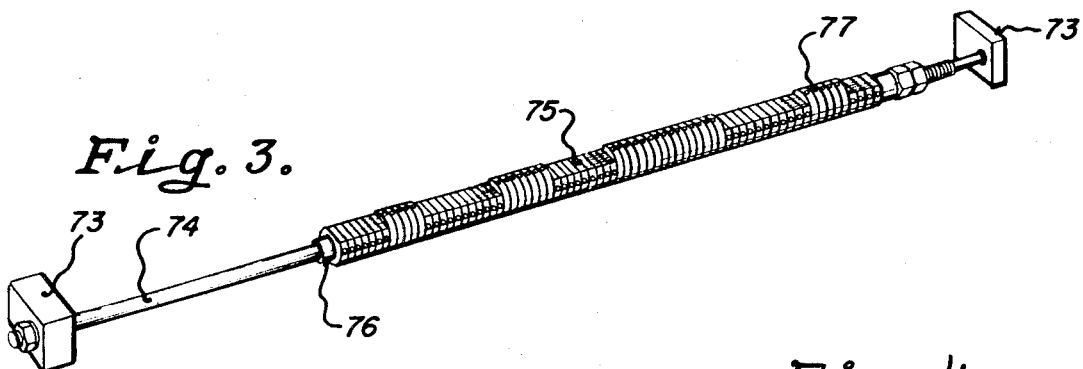
FIG. 3 is a perspective view of the cam surface controlling an operation on a machine.
Figure 4:
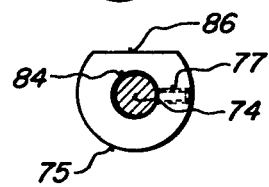
FIG. 4 is a plan view of a cam segment for the cam surface of FIG. 3.

In addition, on the front side of the machine, the flanges 65 and 68 also mount blocks 73 which hold the ends of a cam rod 74, the rod having a plurality of cam segments 75 thereon to be held in position on the rod by means of adjustable-sleeve-type members 76 and suitable lock screws 77 therein. Thus the cam rod 74 with the segments 75 thereon will define a cam surface which moves with the conveyor. It is adapted to be contracted by a stationary switch 80 mounted on the frame and having a cam follower 82 which will be positioned above the cam surface and in contact with the same. As will be best seen in FIGS. 3 and 4, the cam segments 75 are generally cylindrical in form having an aperture 84 in the center of the same by means of which they are mounted on a rod 74 to be journaled thereon. The segments each have a flat surface 86 defined by a cord line and when all of the segments are positioned in abutting relationship on the supporting rod and in the same relationship relative to one another will define a plane or flat surface over which the cam follower 82 will roll. By rotating the individual segments through 90° or more a raised surface will be presented above the flat surface which will cause the cam follower to move upward operating the switch 80 associated therewith.

Also positioned on the guide plate 52 and near the flared end of the same is a flap closure mechanism, indicated generally at 90, and having a curved rodlike arm 92 connected to a pivoted shaft 94 journaled in mounting blocks 95 and carried by the guide plate 52. The shaft 94 is connected to an actuator 98 having a cylinder mounted on the guide plate 52 at 99 and with its actuating shaft 97 connected through a belt-crank-type linkage 96 to the shaft or post 94 to pivot the same and hence rotate the arm 92. Suitable air lines 100 lead to a control switch or valve 101 operated from a manually operated switch 102. The actuators 40 and 98, as well as a pair of actuators to be hereinafter identified, are operated form a pneumatic source with the actuators 98 and 40 being under control of the switch 102.

Intermediate the extent of the machine and overlying a portion of the bed 30 is a raised portion 110 of the frame. It mounts a U-shaped yoke member 115 through suitable guides 116 which slide on the raised portion 110 to guide the yoke for vertical movement thereon through adjustment of a screw member 120 carried by the top of the frame and connected to the yoke through a journal member on the same and indicated at 122. The yoke in turn pivotally mounts a pair of actuators 124, 125 through journaling brackets 126 with the shaft extremities 128, 129 being connected to pivotally mounted closure plates 130, 131. The closure plates 130, 131 are pivoted on U-shaped bracket members 132 attached to flanges 133 connected to the U-shaped yoke member 115. In addition, the yoke 115 carries a housing 140 on which is mounted a pair of adjustably positioned flap folding arms, indicated at 144, an inner flap folding plate 145 and a glue applicating tube 150. The arms in addition to being elevated with movement of the yoke may be moved longitudinally of the housing through adjustable screws 155 with similar movement being imparted to the flap folding plate. The glue applicator tube will also be adjusted through a similar adjusting mechanism, indicated at 160, to vary the longitudinal position of the same. Thus the flap folding arms 144, plate 145 and the glue applicator tube 150 will be adjusted longitudinally of the housing and moved with the housing vertically with yoke movement to accommodate varying sized cartons.

As the conveyor moves a carton along the guide path or bed after the same has been filled with the contents thereof, the actuator 90 through the kicker arm 92 will close the trailing inner flap. As the carton approaches the glueing station, the inner flap folding plate 145 will fold the forward inner flap of the carton and the arms 144 will engage the side flaps and tilt the same inwardly with glue applicating tube 150 being positioned between the flaps. Glue will be applied in accord with the shape of the cam surface and the contact of the switch follower thereon such that it may be spaced in any desired pattern along the inner surfaces of the top flaps of the carton. Further movement from the glueing station will cause the edges of the carton flaps to be deflected downwardly upon engagement of a camming surface on the underside of housing 140, indicated at 168, so that the glued and folded top flaps will continue to be folded on to the inner flaps until the pressing station is reached. At this point the pivoted wing plates 130, 131 will be pivoted down through operation of the respective actuators 124, 125 to seal the top flaps on the inner carton flaps. When the sealing procedure is completed, the next carton entering the press station will move the previously sealed carton into a roller or discharge section where continued pressure is applied to the flaps to insure seal of the same. The frame 20 of the machine has an elevation at the discharge extremity which is greater than at the loading and flap folding and glueing portion of the machine as evidenced by the U-shaped upright portions 170, 172. These mount the beds for the lower roller section 175 and adjustably mount the upper rolling bed 176 which is attached to the tops of the portions of the portions 170, 172 through suitable adjusting screws 180. The latter have pulleys 182 attached to the same with the extension of the bolts being threaded into the roller frame 176. A handle 186 is connected to one of the bolts and cable means 187 extends therefrom and around the respective pulleys permits uniform movement of the upper roller section 176 such that the same is parallel to the lower roller bed or section 175 which is at the level at the end of the bed 30 at the press section of the machine. This will adjust or space the roller sections apart so that varying sized cartons may be accommodated therein and insures that the upper roller section will engage the upper surface of the carton to insure continued application of the pressure thereto for flap sealing purposes as the same is discharged from the machine.

In the operation of this simplified top closure sealer machine, erected and unfilled cartons are fed onto the bed through the flared open end of the conveyor and when positioned on the end of the bed may be loaded or filled by an operator. The conveyor 50 formed by the guide plates 51, 52 will have its pivoted flanges 56 engaging the back side of a carton so that as the actuator 40 is operated through operation of the knee control or switch 102 after loading, the entire carton may be slid down the bed toward the flap folding and glueing station. As it leaves the filling portion of the machine, the actuator 98 will operate to close or move the arm 92 engaging the trailing inner flap and moving it to a folded position. The stroke of the actuator is such that a carton will be moved from the loading station to the station where glueing and flap folding is to start in a single operation. As the actuator returns to the rest or shaft extended position for the the conveyor, the return of the guide plates will be such that the pivoted flanges 56 therein will slide around the edge of the carton and the next set of flanges 56 or intermediate the extent of the plates will be in a position to engage the trailing side of a carton while those at the loading extremity will be positioned behind the next succeeding carton to be filled. On the next successive operation of the actuator, the flap folding arms 144 will engage the side flaps after the forward flap folding plate 145 has folded the forward inner flap of the carton down into a folded position. At the same time, glue will be spread on the undersurface of the partly folded upper flaps in accord with the raised cam segments in the cam surface of the glue applicator control. The glue applicator tube 150 remains stationary as do the folding arms 144 as the carton is next moved with the successive operation of the conveyor actuator 40 until the carton has passed the arms 144 and the glue tube 150. At this point the carton will be approaching the undersurface of the housing 140 having the camming surfaces 168 thereon which will continue deflection of the top flaps of the carton into the press station. At the press station, the carton flaps will be fully deflected down such that the outer flaps engage the inner flaps Actuators the carton. Actuators 124, 125 will be energized through control of either the initiating switch 102 or a separate controller responsive to an indication the carton is beneath the folding press flaps 130, 131 at which time the plates will apply pressure to the top flaps of the carton to seal the same. Such pressure will be maintained during the sequence of operation for the next conveyor operation at which time the next succeeding carton will force the carton at the press station onto the roller section which is adjusted in spacing such that the top and bottom roller bed will engage the top and bottom of the respective cartons applying continued pressure to the same. At this point the movement of the cartons will not be effective by movement of the conveyor directly but rather through engagement of succeeding cartons which will, as cartons are moved from the press station, force through contact the prior cartons out through the roller section to be removed manually.

The improved machine permits adjustment of size of the conveyor and adjustment of positioning of the glue applicator and folding arms through adjustment of the yoke height and adjustment of the position of the folding arms and glue applicator through the adjusting screws 155, 160 to a proper relationship with respect to the size of the flaps of the carton and the positioning of the same. In addition, the cam surface will be adjusted by rotation of the cam segments 75 so that the switch 80 responsive thereto, which is operated by movement of the cam follower 82 over the cam surface, will provide a desired glue pattern on the flaps or the desired application of glue for the size of the respective flaps of a carton. In this manner, the segments 75 may be rotated on the shaft 74 to be raised or with their flat surfaces flush with adjacent flat surfaces on adjacent cam segments to determine switch operation. Desired glue patterns may be obtained by adjusting the cams so that glue may be applied to any portion of the flap or over the entire flap depending upon carton requirements.

While I have shown the improved cam structure as applied to a glue applicator control, it will be understood that it could be applied to any other desired working function on an object being conveyed. Therefore, in consideration of the present invention it should be remembered that the present disclosure is illustrative only and that the scope of the invention should be determined by the appended claims.

What is claimed is:

1. A box sealer comprising, a frame, a reciprocating conveyor mounted on the frame, guide means included in the conveyor and positioned on the frame defining a guide path for cartons thereon, an actuator included in the reciprocating conveyor and positioned below and connected to the guide means on the frame such that the guide means is adapted to engage cartons positioned on the frame and slidably move the same along the guide path on the frame, a glue applicator positioned on the frame above the conveyor and adapted to extend between certain of the flaps on a carton as it moves along the guide path, flap closure means positioned at varying points along the frame and adapted selectively to fold certain of the flaps of a carton, and a control for the glue applicator having relatively movable elements, one of said elements of said control being mounted on the frame and the other of the elements being mounted on the conveyor, said control including switch means having a cam follower thereon and a cam surface adapted to be contacted by the cam follower of the switch means, said cam surface having adjustable surfaces therein to vary the shape of the composite cam surface and the operation of the switch means.

2. The box sealer machine of claim 1 in which the cam surfaces formed by a plurality of segments held together in assembled relationship on the frame with individual segments being adjustable relative to one another to vary the shape of the composite cam surface.

3. The box sealer machine of claim 2 in which the plurality of segments are journaled on a shaft mounted on the frame and aligned with movement of the switch means and its cam follower.

4. The box sealer machine of claim 3 in which the individual segments are circular elements with apertures at the center thereof to mount the same on the shaft and a flat surface therein defined by a cord line to provide a camming surface.

5. The box sealer machine of claim 4 and including means holding the plurality of segments in assembled relationship on the shaft with said segments being journaled thereon and adapted to be moved through 90° of rotation to provide a raised cam surface.

6. The box sealer machine of claim 1 in which the element of the control for the glue applicator which is the switch means with a cam follower thereon is carried by the frame and the cam surface element is carried by the conveyor.

7. The box sealer machine of claim 1 in which the guide means are adjustably mounted on the frame to be moved toward and away from one another to accommodate varying sized cartons and in which the flap closure means of the glue applicator are adjustably mounted on the frame for adjustable vertical movement to accommodate varying sized cartons.

8. The box sealer machine of claim 7 in which the conveyor is a linear actuator, and the guide means includes pivoted carton engaging means positioned therein and adapted to engage the side edges of a carton and move the same along the guide path on the frame.

9. The box sealer machine of claim 8 and including control means mounted in part in the guide path at varying points along the extent of the same and connected respectively to certain of the flap closure means to operate said certain of the closure means at varying points along the guide path.

10. The box sealer machine of claim 9 in which the linear actuator imparts stepped movement to cartons on the frame with the extremity of the guide path remote from the glue applicator being a loading station after which one of the control means in the guide path operates a flap closure means to close one of the flaps of a carton and with operation of the actuator moves the carton to a glue application position on the guide path, and with other of the control means in the guide means being operative with further successive movement of the carton from the glue application station to close other of the flaps of a carton.

11. The box sealer machine of claim 10 and including a top closure station with top flap closure means pivotally mounted on the frame and adapted to move pivotally to engage the top flaps of a carton and seal the carton.

12. The box sealer machine of claim 10 in which the top flap closure means, the glue applicator and certain of the flap closure means are all positioned on an adjustably mounted portion of the frame to be vertically and longitudinally adjusted for varying sized cartons.

13. A machine comprising, a base frame, a reciprocating conveyor mounted on the frame and defining a path of movement for an object thereon, a plurality of work performing means positioned on the frame and adapted to contact the object and perform a work function thereon, and a control for one of the work performing means including relatively movable elements one of which is carried by the frame and the other of which is positioned on the conveyor which elements contact one another with movement of the conveyor, one of said elements being a cam surface having adjustable segments therein to vary the shape of the cam surface and hence the control of the operation of said one of said work performing means in accord to the shape of the cam surface.

14. The machine of claim 13 in which the elements of the control include a switch having a cam follower therein and the cam surface with the switch being stationarily mounted on the frame and the cam surface being carried by the conveyor.

15. The machine of claim 13 in which the cam surfaces formed by a plurality of segments held together in assembled relationship on the frame with individual segments being adjustable relative to one another to vary the shape of the composite cam surface.

16. The machine of claim 13 in which the plurality of segments are journaled on a shaft mounted on the frame and aligned with movement of the switch means and its cam follower.

17. The machine of claim 13 in which the individual segments are circular elements with apertures at the center thereof to mount the same on the shaft and a flat surface therein defined by a cord line to provide a camming surface.

18. The machine of claim 13 and including means holding the plurality of segments in assembled relationship on the shaft with said segments being journaled thereon and adapted to be moved through a predetermined angle of rotation to provide a raised cam surface.